United States Patent [19]

Walters et al.

[11] 4,018,858

[45] Apr. 19, 1977

[54] METHOD OF MANUFACTURING REFRACTORY ARTICLES

[75] Inventors: Ian Richard Walters, Huddersfield; Harold Garton Emblem, Mirfield, both of England

[73] Assignee: Zirconal Processes Limited, Bromley, England

[22] Filed: Mar. 24, 1975

[21] Appl. No.: 561,245

[30] Foreign Application Priority Data

Mar. 28, 1974 United Kingdom ............ 13834/74
Aug. 13, 1974 United Kingdom ............ 35610/74

[52] U.S. Cl. .................................. 106/57; 106/58; 264/63; 264/86
[51] Int. Cl.$^2$ .................. C04B 35/04; C04B 35/48
[58] Field of Search ............ 264/56, 63, 86; 106/57

[56] References Cited

UNITED STATES PATENTS

| | | | |
|---|---|---|---|
| 3,232,771 | 2/1966 | Pearce | 106/38 |
| 3,607,319 | 9/1971 | Scott | 106/56 |

FOREIGN PATENTS OR APPLICATIONS 979,197  1/1965  United Kingdom ................ 106/57

Primary Examiner—Robert F. White
Assistant Examiner—John Parrish
Attorney, Agent, or Firm—Christensen, O'Connor, Garrison & Havelka

[57] ABSTRACT

The invention concerns the binding of refractory powders into self-supporting "green" shapes which are fired to provide refractory objects. In accordance with the invention the binders are based on zirconium salts and include a dispersion of calcined magnesia in a mixture of water and a polyhydric alcohol. The magnesia reacts with the zirconium salt to form zirconium oxide/hydroxide which gels hard. In order to control the speed of gelling a separate gel time delaying agent is also optionally included.

7 Claims, No Drawings

METHOD OF MANUFACTURING REFRACTORY ARTICLES

This invention relates to the manufacture of refractory articles. More specifically the invention relates to a manufacturing process wherein a flowable liquid slurry of a refractory powder dispersed in a liquid binder is prepared and poured into an appropriately shaped mould and allowed to set by gellation of the binder. The set moulded shape, referred to as the 'green' shape, is then removed from the mould and fired into a sintered refractory mass.

For such a process to be commercially successful the following parameters have to be satisfied:

1. The binder and the refractory particles must be capable of producing a slurry which is sufficiently fluid to fill a complex mould.
2. The gelling time of slurry should, preferably, be controllable. Thus to produce a simple shape such as a rectangular block the moulding operation can be carried out rapidly and, in order to achieve an economically viable process when a single mould is used, the setting of the binder should be caused to take place as rapidly as possible. In the case of a complex shape, such as a burner part, however, filling and handling of the mould is a slower operation and the gellation should be correspondingly delayed.
3. The 'green' shape should have reasonable strength to allow a complex shape to be removed from the mould and transported to a drying oven and then to a firing furnace. The breakage of a green shape wastes valuable material, the setting of the binder being an irreversible process, and time.
4. After firing the binder should leave a matrix which effectively binds the refractory particles together.
5. After firing the binder should leave only highly refractory residues to constitute the matrix.

In the past, binders derived from organic silicates which hydrolyse under appropriate conditions to give silicic acid have been widely used. Silicic acid gells to set the slurry and after firing leaves silica as the refractory matrix holding the refractory grains together. Silica is a refractory oxide and is recognised as such, but its refractory properties do not compare favourably with the refractory properties of, for example, alumina and zirconia. Additionally, ethyl silicate being manufactured from ethyl alcohol, which is a petroleum-derived product, is becoming increasingly expensive.

It is an objective of the present invention to provide a binder for refractory powders such binder being based on zirconium compounds which binder after firing leave a highly refractory residue of zirconia as the principal constituent refractory matrix.

U.K. Patent Specification No. 979,197 of the Zirconium Corporation of America relates to a refractory cement consisting of a dry mix of refractory powders, binder and gelling agent which when wet and worked into a viscous self-supporting consistency can be 'trowelled' into moulds to form simple shapes. Group IVB organic salts such as zirconium acetate are suggested as binders. The parameters set out above are not necessary as, at cement consistencies, control of gellation is not significant as the cement in itself is sufficiently coherent to form a rigid shape. The compositions referred to in this specification are not liquid flowable slurries capable of being poured into and filling the cavities of complex moulds.

U.S. Pat. No. 3,203,812 of Unilever Limited, relates to organic zirconium esters which are covalent complexes and have to be dissolved in expensive and inconvenient organic solvents such as carbon tetrachloride. The techniques of this Patent Specification are costly and complex.

According to the present invention there is provided a method of manufacturing refractory articles such method comprising the steps of:

a. preparing a gellable liquid binder by mixing an aqueous solution of a zirconium salt and a dispersion of magnesia powder in a mixture of water and a polyhydric alcohol;

b. mixing a refractory powder with the liquid binder and forming a liquid flowable slurry;

c. pouring the slurry into a mould to fill the cavities of the latter;

d. allowing the slurry in the mould to set to a coherent green shape;

e. drying and firing the green shape into a sintered refractory mass.

The magnesia, after firing remains as highly refractory grains along with the highly refractory zirconia. The solvents are dispersed as a vapour.

The terms 'heavy and light' in calcined magnesia powder refer to bulk density and particle size. Thus 'heavy' calcined magnesia powder has relatively large grains and relatively high bulk density. 'Light' calcined magnesia has relatively small particles and a relatively low bulk density. Typically 20 g light calcined magnesia will occupy a volume of not less than 150 cc. Light calcined magnesia powder is preferred in the methods of the present invention wherein a separate gell controlling agent is used. The calcining operation carried out on the magnesia is preferably of short duration and to obtain a lightly calcined magnesia calcination is carried out typically between 600° and 900° C. This is in contrast to the "dead burning" procedure wherein temperatures over 900° are used. In general terms "dead burned" magnesia is less soluble in acids than "calcined" magnesia.

The time of gelling of the binder is influenced by grain size in the calcined magnesia powder. The larger the grain size the longer is the gell time. Thus, in practice control of gelling time can be achieved by selecting the appropriate particle size. We prefer, however, to control the speed of gelling by adding a separate substance selected from the group consisting of magnesium salt, ammonium lactate, a compound which in solution provides a dipolar ion (Zwitterion) in, a polyhydric alcohol and a monosaccharide.

Suitable aqueous solutions of the zirconium salt include aqueous solutions of zirconium acetate, zirconium oxychloride, zirconium formate (all acidic) and ammonium zirconium carbonate (basic).

Although any refractory powder may be used the system is especially suitable for use with zircon and zirconia also magnesia and other basic refractories, such as chrome magnesite systems. The system of the invention can also be used to bind acidic or neutral refractories such as alumina and silicon carbide. The fusion product of zircon sand and alumina is a suitable refractory aggregate.

The magnesia dispersion is conveniently prepared by adding calcined light magnesia to a mixture of water and glycerol or ethylene glycol, then warming the mixture to 70° C, stirring during warming. Alternatively, a mixture of glycerol and/or ethylene glycol with water is warmed to 70° C and light calcined magnesia slowly added with stirring. Heavier, i.e., larger particle size, magnesia may be dispersed similarly by either of these procedures. Warming the mixture of water and polyhydric alcohol during preparation of the magnesia dispersion appears advantageous and 70° C is a convenient temperature.

A suitable zirconium oxychloride solution is described in Baco (Registered Trade Mark) Chemicals data sheet No. 433(British Aluminium Co. Ltd.). This solution has a $ZrO_2$ content of 20% nominal ($ZrO_2$- 19–21%).

A suitable zirconium acetate solution is described in Baco Chemicals data sheet No. 431 (British Aluminium Co. Ltd.). This solution has a $ZrO_2$ content of 22% nominal, ($ZrO_2$- 21–23%).

The following examples illustrate the present invention:

PREFERRED METHOD OF PREPARING THE MAGNESIA SUSPENSION

The required weight of calcined magnesia powder is dispersed in 100 ml of the suspending medium (polyhydric alcohol and water) while heating the medium to 70° C. The suspension was held at 70° C for two minutes and then cooled to ambient temperature.

EXAMPLE I

A shaped refractory, suitable for use as an electric element carrier in electric furnaces, was prepared by mixing 25 ml of zirconium acetate solution 22% with 15 ml of calcined magnesia suspension (15 grams light calcined magnesia dispersed in 50 ml water and 50 ml ethylene glycol), then adding 420 grams of a mixture of zircon and zirconia powders. The slurry was poured into a suitable mould (which was being vibrated) and allowed to set. After one minute, the object was removed from the mould, allowed to air-dry, then fired at 1550° C to give the shaped refractory.

The mixture of zircon and zirconia powders comprised:
  Zircon sand — 7 parts by weight (all passing 60 mesh B.S. 410 sieve)
  Zircon flour — 2 parts by weight (all passing 200 mesh B.S. 410 sieve)
  Zirconia — 1 part by weight (all passing 200 mesh B.S. 410 sieve)

EXAMPLE II

A crucible was prepared by mixing 32 ml zirconium oxychloride solution 22% with 18 ml magnesia suspension (10 grams magnesia heavy grade dispersed in 50 ml water and 50 ml glycerol), then adding 400 grams of the following refractory powder composition:
  Carbomul—U.S.A. Registered Trade Mark— 6F — 55% by weight
  Carbomul—U.S.A. Registered Trade Mark — 40F — 25% by weight
  Alcoa calcined alumina A2 — 325 mesh — 20% by weight Carbomul is the fusion product of zircon sand and calcined Alumina sold by the Carborundum Company. The resulting slurry was poured into a suitable mould, which was being vibrated. When the slurry had set (after about 7 minutes) the object was removed from the mould, then air-dried and fired at 1550° C to give a crucible.

EXAMPLE III

A crucible was prepared by mixing 26.5 ml zirconium oxychloride solution 20% with 23.5 ml calcined magnesia suspension (prepared as in Example II), then adding 400 grams of the refractory powder composition of Example I. The resulting slurry was poured into a mould, which was being vibrated. When the slurry had set, the object was removed from the mould, then air-dried and fired at 1550° C to give a crucible.

EXAMPLE IV

A shaped refractory, suitable for use as an electric element carrier in electric furnaces, was prepared by mixing 21.2 ml of zirconium oxychloride solution 20% with 18.8 ml of magnesia suspension (prepared as in Example II), then adding 200 grams of a powdered sillimanite mix. The slurry was poured into a suitable mould, which was being vibrated, then allowed to set. The object was then removed from the mould, allowed to air-dry and fired at 1450° C to give the shaped refractory.

The refractory powder used was -16+30 Molochite (Registered Trade Mark) — 2 parts by weight. An aluminosilicate refractory aggregate, produced from a china clay subjected to a calcination at above 1500° C.)
  100 CML P.B. Sillimanite — 1⅔ parts by weight
  −100 fused alumina — ⅓ part by weight
  The screen sizes are B.S. 410 sieves.

The following further description evaluates the gelation properties of aqueous solutions of zirconium acetate and zirconium oxychloride when suspensions of calcined magnesia in polyhydric alcohol — water mixtures are used as gelling agents.

PREPARATION OF MAGNESIA SUSPENSIONS

The following method of preparation was used. The required weight of calcined magnesia powder (fine or heavy grade) was dispersed in 100 ml of a suspending medium comprising a polyhydric alcohol and water while heating the medium to 70° C. The suspension was held at 70° C for two minutes and then cooled to ambient temperature.

EXPERIMENTS WITH ZIRCONIUM ACETATE SOLUTION 22%

Data concerning the effect of alcohol type and magnesia content on gellation characteristics are given in Table I.

Table I

Effect of alcohol type and magnesia content of dispersion on zirconium acetate solution.

| Composition of Suspension | | | Gelation Properties | | | |
|---|---|---|---|---|---|---|
| Wt. MgO (gms) fine grade | % ethylene glycol | % glycerol | Vol. Suspension (mls) | Vol. Zirconium Acetate sol. (mls) | Gelling Time | Observations |
| 10 | 50 | — | 5 | 9 | 35 secs. | strong, clear gel |
| " | " | — | 4 | 9 | 40 secs. | strong, clear gel |
| " | " | — | 3 | 9 | | viscous but no gel |
| 10 | — | 50 | 5 | 9 | 45 secs. | strong gel |

Table I-continued

Effect of alcohol type and magnesia content of dispersion on zirconium acetate solution

| Composition of Suspension | | | | Gelation Properties | | |
|---|---|---|---|---|---|---|
| Wt. MgO (gms) fine grade | % ethylene glycol | % glycerol | Vol. Suspension (mls) | Vol. Zirconium Acetate sol. (mls) | Gelling Time | Observations |
| " | — | " | 4 | 9 | 45 secs. | strong gel |
| " | — | " | 3.5 | 9 | 65 secs. | firm gel* |
| " | — | " | 3.0 | 9 | | viscous but no gel |
| 5 | — | 50 | 7 | 9 | 45 secs. | strong gel |
| " | — | " | 6 | 9 | 90 secs. | firm gel* |
| " | — | " | 5.8 | 9 | 2 mins. 45 secs. | weak gel |
| " | — | " | 5.0 | 9 | | clear but no gel |
| 10 | — | 80 | 5 | 9 | 80 secs. | firm gel |
| " | — | " | 4 | 9 | 95 secs. | firm gel* |
| " | — | " | 3 | 9 | | clear but no gel |
| 5 | — | 80 | 7 | 9 | 3 mins. 30 secs. | quite firm gel* |
| " | — | " | 8 | 9 | 4 mins. | firm gel* |
| " | — | " | 6 | 9 | 6 mins. 30 secs. | weak gel |
| " | — | " | 5 | 9 | | slightly viscous but no gel |

It will be noted that the more useful gel times i.e., those starred in the table are obtained by decreasing magnesia content and increasing the proportion of polyhydric alcohol. In those cases, however, the gels formed may lack strength. In an attempt to obtain both practical gel times and strong gels several experiments were carried out using a coarser grade of calcined magnesia (MgO heavy Cat. No. 29110 B.D.H. Chemicals Ltd.). Table II gives the results of experiments involving the use of this heavy grade of magnesia and zirconium acetate solution.

TABLE II

Gelation of Zirconium acetate solution using dispersion of Heavy Magnesia

| Composition of Suspension | | | | Gellation Properties | | |
|---|---|---|---|---|---|---|
| Wt. MgO (gms) (heavy grade) | % ethylene glycol | % glycol | Vol. Suspension (mls) | Vol. Zirconium Acetate sol. (mls) | Gelling Time | Observations |
| 10 | 50 | — | 7 | 9 | 1 min. 10 secs. | slightly weak turbid gel |
| " | " | — | 5 | 9 | 1 min. 30 secs. | slightly weak turbid gel |
| " | " | — | 4 | 9 | 2 mins. 45 secs. | slightly weak turbid gel |
| 10 | — | 50 | 6 | 9 | 1 min. 20 secs. | firm gel* |
| " | — | " | 5 | 9 | 1 min 40 secs. | firm gel* |
| " | — | " | 4 | 9 | 3 mins. | firm gel* |
| " | — | " | 3.5 | 9 | 4.5 mins. | firm gel* |
| " | — | " | 3 | 9 | | viscous but no gel |
| 10 | — | 30 | 7 | 9 | 50 secs. | firm gel* |
| " | — | " | 5 | 9 | 1 min. 40 secs. | firm gel* |

As a gelling agent, the coarse grade of magnesia offers advantages over the fine grade, - practical gel times and strong gels, as well as reasonable control of the gellation behaviour. Here again the useful values are starred.

An alternative approach to gelling in a satisfactory manner the zirconium acetate/magnesia system involves the use of sorbitol, to delay and control the gelation process.

The data obtained with sorbitol are given in Table III. The suspensions used were prepared by dispersing 10 g light magnesia in sorbitol solutions of different concentrations while heating to 70° C. 100 ml of the sorbitol solution was used. TABLE III Effect of Sorbitol on gelation of zirconium acetate solution using dispersion of light magnesia.

| % Sorbitol in solution | Vol. of suspension (ml) | Vol. of Zirconium Acetate Sol. (ml) | Setting Time | Observations |
|---|---|---|---|---|
| 17 | 1 | 9 | 8 mins. | Weak gel |
| 17 | 6 | 9 | 5 mins. | Weak gel |
| 17 | 5 | 9 | 2 mins. 15 secs. | Weak gel |
| 17 | 4 | 9 | — | No gel |
| 13 | 9 | 9 | 1 min. 50 secs. | Soft gel |
| 13 | 7 | 9 | 55 secs. | Soft gel |
| 13 | 5 | 9 | 65 secs. | Soft gel |
| 10 | 7 | 9 | 40 secs. | Firm gel, good binding properties |
| 10 | 5 | 9 | 50 secs. | Firm gel, good binding properties |
| 10 | 4 | 9 | 1 min. 40 secs. | Weak gel |
| 10 | 3 | 9 | — | No gel |

No gels formed if % sorbitol in solution is 25% or greater. Useful values are starred.

Table IV shows the effect of glycerol concentration and magnesia content on the gelation characteristics of zirconium oxychloride solution, using light magnesia.

TABLE IV

Gelation of Zirconium Oxychloride Solution using dispersion of light magnesia

| Composition of Suspension | | Gellation Properties | | | |
|---|---|---|---|---|---|
| Wt MgO (gms) | % glycerol | Vol. Suspension (mls) | Vol. Zirconium oxychloride (mls) sol. | Gelling Time | Observations |
| fine grade 10 | 50 | 5 | 9 | 15 secs. | Clear, strong gel |
| " | " | 4.75 | 9 | | viscous but no gel |
| " | " | 4.5 | 9 | | viscous but no gel |
| " | " | 4 | 9 | | viscous but no gel |
| 5 | 70 | 10 | 9 | 35 secs. | firm gel. |
| " | " | 9 | 9 | 2 mins. 30 secs. | Weak gel. |
| " | " | 8 | 9 | | viscous but no gel |
| " | " | 5 | 9 | | viscous but no gel |
| 5 | 80 | 10 | 9 | 30 secs. | Firm gel. |
| " | " | 9 | 9 | 1 min. 50 secs. | Weak gel. |
| " | " | 8 | 9 | | viscous but no gel |
| " | " | 6 | 9 | | viscous but no gel |
| " | " | 5 | 9 | | viscous but no gel |

As with the zirconium acetate solution best results are achieved at low magnesia and high glycerol concentrations. In an attempt to achieve better control of the gellation behaviour of the zirconium oxychloride solution experiments with magnesia coarse grade (MgO heavy, Cat. No. 29110 B.D.H. Chemicals Ltd.) were carried out. The results are given in Table V.

TABLE V

Gelation of Zirconyl Chloride solution using dispersion of heavy magnesia

| Composition of Suspension | | Gellation Properties | | | |
|---|---|---|---|---|---|
| Wt. MgO (gms) | % glycerol) | Vol. Suspension (mls) | Vol. Zirconium oxychloride sol. (mls) | Gelling Time | Observations |
| heavy grade 10 | 50 | 8 | 9 | 70 secs. | Firm gel after 2.5 mins. |
| " | " | 7 | 9 | 1 min. 30 secs. | Firm gel after 4 mins. |
| " | " | 6 | 9 | 3 mins. | Firm gel after 8 mins. |
| " | " | 5 | 9 | 10 mins. | Firm gel after 25 mins. |
| " | " | 4 | 9 | | No gel |
| 5 | 50 | 14 | 9 | 2 mins. | Gel developed strength slowly |
| " | " | 13 | 9 | 2 mins. 30 secs. | Gel developed strength slowly |
| " | " | 12 | 9 | 2 mins. 45 secs. | Gel developed strength slowly |
| " | " | 11 | 9 | 3 mins. 30 secs. | Gel developed strength slowly |
| " | " | 10 | 9 | 5 mins. 30 secs. | Gel developed strength slowly |
| " | " | 9 | 9 | 8 mins. 30 secs. | Gel developed strength slowly |
| " | " | 8 | 9 | 50 mins. | Weak gel. |

The data shows that the addition of the magnesia coarse grade gives a good range of practical gel times as well as firm gels.

EXAMPLES DEMONSTRATING USE OF ZIRCONIUM ACETATE AND OXYCHLORIDE SOLUTIONS WITH MAGNESIA SUSPENSIONS IN THE PREPARATION OF SHAPED REFRACTORY OBJECTS.

EXAMPLE V

A crucible was prepared by mixing 34.6 ml zirconium acetate solution 22% with 15.4 ml calcined magnesia suspension (10 g MgO heavy grade dispersed in 70 ml water and 30 ml glycerol), then adding 400 g fused mullite. The slurry was poured into the mould, which was vibrated. When the slurry has set (after approximately 10 mins.), the crucible was removed from the mould, air-dried and fired at 1550° C.

EXAMPLE VI

A crucible was prepared by mixing 20 ml calcined magnesia suspension (prepared as in Example V) with 30 ml zirconium oxychloride solution 20% then adding 400 g fused mullite. The slurry was poured into the mould, which was vibrated. After removal from the mould, the crucible was air-dried and then fired at 1550° C. The preparation of the fused mullite used in Examples V and VI is given by Sargeant, Isherwood and Atthis, Refractories Jnl., 1973 June, pp 12–18.

EXAMPLE VII

An element carrier was prepared by mixing in the order:
- 32 ml zirconium acetate solution 22%
- 18 ml calcined magnesia suspension (prepared as in Example V)
- 300 g magnesia mix comprising 2 parts by weight MgO coarse grade and 1 part by weight MgO fine grade (Thermal Syndicate Products)

The resulting slurry was poured into the mould, which was vibrated. After 10 minutes when the slurry had hardened, the carrier was removed from the mould, air-dried and then fired at 1550° C.

EXAMPLE VIII

An element carrier was prepared using magnesia supplied by Dynamit Nobel (U.K.) Ltd. The quantities of components used were as follows:
- 32 ml zirconium acetate solution
- 18 ml calcined magnesia suspension (prepared as in Example V)
- 300 g magnesia mix comprising 2 parts by weight fused magnesia −8 + 30 mesh 1 part by weight fused magnesia −240 mesh The resulting slurry was poured into the mould and allowed to set. After 5 mins. the carrier was removed from the mould, air-dried and then fired at 1550° C. The mesh sizes refer to British Standard 410 sieves. The fused magnesia used is sold under the name of Dynamag.

EXAMPLE IX

A crucible was prepared using a fused alumina supplied by Cawoods Refractories Ltd. To 30 ml zirconium oxychloride solution 20% were added 20 ml calcined magnesia suspension (prepared as in Example V) followed by 400 g fused alumina mix. (The mix consisted of 7% by weight fused alumina-3/16+⅛, 23% by weight fused alumina−⅛1/16, 30% by weight fused alumina−1/16 + 22, 40% by weight fused alumina − 100). The resulting slurry was poured into the mould and allowed to set. After approximately 15 minutes, the crucible was removed from the mould, air-dried and then fired at 1550° C. The mesh sizes refer to British Standard 410 sieves.

EXAMPLE X

A crucible was prepared by mixing 32 ml zirconium acetate solution 22% with 18 ml calcined magnesia suspension (prepared as in Example V), then adding 400 g fused alumina mix (composition as in Example IX). The crucible so obtained was removed from the mould after approximately 15 mins and then air-dried and fired at 1550° C.

EXAMPLE XI

A crucible was prepared by mixing 39 ml zirconium acetate solution 22% with 21 ml magnesia suspension (prepared as in Example V), then adding 400 g silicon carbide mix. (The mix consisted of 2 parts by weight silicon carbide, coarse grade, and 1 part by weight silicon carbide, fine grade). The resulting slurry was poured into the mould, which was vibrated. When the slurry had hardened, after approximately 10 mins, the crucible was removed from the mould, air-dried and fired at 1550° C.

EXAMPLE XII

A crucible was prepared by mixing 36 ml zirconium oxychloride solution with 24 ml calcined magnesia suspension (prepared as in Example V), then adding 400 g silicon carbide mix (composition as in Example XI). The resulting slurry was poured into the mould, which was vibrated. When the slurry had hardened (after approximately 10 mins.), the crucible was removed from the mould, air-dried and fired at 1550° C.

Ageing Tests on a Magnesia Suspension

A calcined magnesia suspension was prepared by dispersing 10 g MgO powder, fine grade, in a suspending medium consisting of 30 ml glycerol and 70 ml water while heating medium to 70° C.

The ageing of this suspension was followed by adding 9 ml zirconium acetate solution to 5 ml suspension at various intervals and noting the gel times obtained. The appropriate data are given below:

| STORAGE TIME (days) | GELLING TIME (secs.) |
| --- | --- |
| (1 hour) | 35 |
| 3 | 60 |
| 6 | 35 |
| 18 | 35 |

It would appear that storing the suspension for a prolonged period of time does not affect its ability to gel an aqueous solution of a zirconium salt.

EXAMPLE XIII

A calcined magnesia dispersion was prepared by dispersing 10 grams of calcined magnesia fine grade in a mixture of 50 ml water and 50 ml ethylene glycol, the mixture of ethylene glycol and water being heated to 70° C. The dispersion was allowed to cool to ambient temperature.

A shaped refractory was prepared by mixing 16 ml of the above magnesia dispersion with 34 ml of zirconium acetate solution 22%, then adding 400 grams of B-40 refractory grain (A. P. Green Co., Mexico, Missouri, U.S.A.). The resulting slurry was poured into a suitable mould (in this case a crucible mould) which was being vibrated and allowed to set. After five minutes, the object was removed from the mould, then air-dried and fired to give a crucible.

B-40 refractory grain is prepared from a philippine chrome ore concentrate and a high purity magnesite (Freeport). The % magnesia content of the gram is 40.

EXAMPLE XIV

Transvaal chrome ore, grade T3 (R. Hostombe Ltd) was used to prepare a shaped refractory object. The preparation of the magnesia dispersion was as described in Example XIII.

A shaped refractory was prepared by mixing 19 ml of magnesia dispersion with 30 ml of zirconium acetate solution 22%, then adding 400 grams of Transvaal chrome ore, grade T3. The resulting slurry was poured into a suitable mould, which was being vibrated, then allowed to set. After five minutes the object was removed from the mould, then air-dried and fired to give the shaped refractory.

PROPERTIES OF TRANSVAAL CHROME ORE GRADE T3

| PROPERTIES OF TRANSVAAL CHROME ORE GRADE T3 | | | |
| --- | --- | --- | --- |
| Typical Analysis | | Screen Analysis | |
| | % | | % |
| $Cr_2O_3$ | 46.0 | A.S.T.M. sieve | |
| FeO | 25.6 | 12 | — |
| $SiO_2$ | 1.3 | 30 | 11.4 |
| MgO | 9.8 | 50 | 52.9 |
| CaO | 0.2 | 100 | 24.8 |
| $Al_2O_3$ | 16.2 | 200 | 8.2 |
| Cr/Fe ratio | 16:1 | Pan | 3.4 |
| $H_2O$ | 1.9 | | |

The remainder of the specification provides some further developments on this zirconium salt calcined magnesia system. Magnesium acetate as a gell-controlling agent is incorporated into the zirconium salt solution. More specifically:

Using acid or neutral refractories, the setting time of a slurry prepared from these refractories and a solution of magnesium acetate in zirconium acetate, plus a suspension of calcined magnesia in aqueous glycerol or ethylene glycol polyhydric alcohols can be controlled by changing the concentration of magnesium acetate in the zirconium acetate solution. Glycerol is preferable to ethylene glycol.

EXAMPLES DEMONSTRATING THE USE OF THE ZIRCONIUM ACETATE/MAGNESIUM ACETATE CALCINED MAGNESIA SYSTEM IN THE PREPARATION OF SHAPED REFRACTORY OBJECTS.

EXAMPLE XV

A shaped refractory, suitable for use as an electric element carrier in electric furnaces, was prepared by mixing 42 ml of a solution of magnesium acetate in zirconium acetate solution prepared by dissolving 15 grams of magnesium acetate crystals, $(CH_3.COO)_2Mg.4H_2O$ in 100 ml of zirconium acetate solution with 18 ml of a calcined magnesia suspension (10 gms light magnesia, LMO, 262 grade) dispersed in 50 ml water and 50 ml glycerol), then adding 300 g of a powdered Sillimanite mix. The resulting slurry was poured into a suitable mould, which was being vibrated, then allowed to set. The object was then removed from the mould, allowed to air-dry and fired at 1550° C to give the shaped refractory.

The refractory powder used was −16+30 Molochite (Registered Trade Mark) − 2 parts by weight. (An aluminosilicate refractory aggregate, produced from a china clay subjected to a calcination at above 1500° C.)
100 CML P.B. Sillimanite — 1⅔ parts by weight
−100 Fused Alumina — ⅓ part by weight
The screen sizes are B.S. 410 sieves.

EXAMPLE XVI

A shaped refractory, suitable for use as an electric element carrier in electric furnaces, was prepared by mixing 42 ml of a solution of magnesium acetate in zirconium acetate solution prepared by dissolving 15 grams of magnesium acetate crystals $(CH_3.COO)_2Mg.4H_2O$ in 100 ml of zirconium acetate solution with 18 ml of a magnesia suspension (prepared as in Example I), then adding 400 gms of a mixture of zircon and zirconia powders (composition as given in Example I). The resulting slurry was poured into the mould and allowed to set. When the slurry had hardened, the element carrier was removed from the mould, air-dried and then fired at 1550° C.

EXAMPLE XVII

A crucible was prepared using a fused alumina mix. To 35 ml of a solution of magnesium acetate in zirconium acetate solution prepared by dissolving 10g of magnesium acetate crystals $(CH_3.COO)_2Mg.4H_2O$ in 100 ml of zirconium acetate solution were added 15 ml of a magnesia suspension (prepared as in Example I) followed by 400g fused alumina mix. (The mix consisted of 7% by weight fused alumina − 3/16 + ⅛, 23% by weight fused alumina − ⅛ + 1/16, 30% by weight fused alumina − 1/16 + 22, 40% by weight fused alumina −100). The resulting slurry was poured into the mould and allowed to set. After approximately 8 minutes the crucible was removed from the mould, air-dried and then fired at 1550° C. The screen sizes are B.S. 410 sieves.

EXAMPLE XVIII

A crucible was prepared by mixing 35 ml of a solution of magnesium acetate in zirconium acetate solution prepared by dissolving 15g of magnesium acetate crystals $(CH_3.COO)_2Mg.4H_2O$ in 100 ml of zirconium acetate solution with 15 ml of a magnesia suspension, then adding 400 g of the refractory powder of Example II. The resulting slurry was poured into a suitable mould, which was being vibrated. When the slurry had set (after about 15 minutes), the crucible was removed from the mould, then air-dried and fired at 1550° C.

EXAMPLE XIX

A crucible was prepared by mixing 25 ml of a solution of magnesium acetate in zirconium acetate solution prepared by dissolving 10 g magnesium acetate crystals $(CH_3.COO)_2Mg.4H_2O$ in 100 ml zirconium acetate solution with 15 ml of a calcined magnesia suspension (prepared as in Example XV), then adding 200 g silicon carbide mix. (The mix consisted of 2 parts by weight silicon carbide, coarse grade, and 1 part by weight silicon carbide, fine grade). The resulting slurry was poured into the mould, which was vibrated. When the slurry had hardened, after approximately 4 minutes, the crucible was removed from the mould, air-dried and fired at 1550° C.

In all these examples, the zirconium acetate solution had a $ZrO_2$ content of 22% w/w.

EXAMPLE XX - Effect of magnesium acetate

A calcined magnesia suspension, obtained by dispersing 10 g magnesia LMO/262 grade in 50 ml glycerol and 50 ml water was used to gel solutions of magnesium acetate $(CH_3.COO)_2Mg.4H_2O$ in zirconium acetate solution The results are given in Table VI.

TABLE VI

Effect of magnesium acetate on the gelation of zirconium acetate by a dispersion of light magnesia in aqueous glycerol.

| Wgt. of magnesium acetate (gms) dissolved in 100 ml of zirconium acetate solution | Vol. of Dispersion (ml) | Vol. of Zirconium Acetate Solution (ml) | T gel |
|---|---|---|---|
| 10 | 5 | 9 | 50 secs. |
| 10 | 6 | 9 | 1¾ mins. |
| 20 | 4 | 9 | 1½ mins. |
| 20 | 5 | 9 | 3½ mins. |
| 20 | 6 | 9 | 20 mins. |
| 24 | 3 | 9 | 4 mins. |
| 24 | 3.5 | 9 | 2¼ mins. |

TABLE VI-continued

Effect of magnesium acetate on the gelation of zirconium acetate by a dispersion of light magnesia in aqueous glycerol.

| Wgt. of magnesium acetate (gms) dissolved in 100 ml of zirconium acetate solution | Vol. of Dispersion (ml) | Vol. of Zirconium Acetate Solution (ml) | T gel |
|---|---|---|---|
| 24 | 4 | 9 | 3 mins. |
| 24 | 5 | 9 | 8 mins. |
| 30 | 4 | 9 | 9 mins. |
| 30 | 5 | 9 | 40 mins. |

It will be noted, that, in general terms, increasing the proportion of magnesium acetate relatively to the volume of magnesia dispersion increases the gelling time.

EXAMPLE XXI

USE OF THE MAGNESIUM ACETATE/ZIRCONIUM ACETATE/MAGNESIA SYSTEM AS A REFRACTORY BINDER - PREPARATION OF REFRACTORY OBJECTS BASED ON SINTERED MULLITE

A slurry was formed by mixing 200 g. sintered mullite with the necessary quantity of binder and the setting time of the slurry noted. The results are given in Table VII.

TABLE VII

SETTING TIME OF SLURRIES OF SINTERED MULLITE AND MAGNESIUM ACETATE/ZIRCONIUM ACETATE/MAGNESIA SYSTEM

TABLE VII

Setting time of slurries of sintered mullite and magnesium acetate/zirconium acetate/magnesia system

| Wgt. of magnesium acetate (gms) dissolved in 100 ml of zirconium acetate solution | Volume of magnesia dispersion (ml) | Volume of Acetate Solution (ml) | Setting Time of Slurry |
|---|---|---|---|
| 0 | 15 | 25 | 2 mins. |
| 4 | 15 | 25 | 4 mins. |
| 4 | 12 | 28 | 3¼ mins. |
| 4 | 17 | 23 | 70 mins. |
| 10 | 15 | 25 | 30 mins. |
| 15 | 28 | 12 | 5 mins. |
| 15 | 26 | 14 | 9 mins. |
| 15 | 25 | 15 | 9 mins. |
| 20 | 29 | 11 | 30 mins. |

All gave good refractory bodies.

The magnesia dispersion was prepared as described in Example XX. The preparation and properties of the sintered mullite are given by Sargeant, Isherwood and Atthis, Refractories Jnl., 1973, June pp 12 – 18.

Refractory shapes were prepared using different refractories and the above binding system. The magnesia suspension used as the gelling agent was obtained by dispersing 10 g light magnesia (LMO/262 grade) in a mixture of 50 ml glycerol and 50 ml water at ambient temperature.

EXAMPLE XXII

PREPARATION OF REFRACTORY OBJECTS BASED ON SILLIMANITE

A slurry was prepared by mixing 200 g Sillimanite mix with 40 ml binder and the time required for the slurry to set was noted. The results are given in Table VIII.

TABLE VIII

SETTING TIME OF SLURRIES OF SILLIMANITE AND MAGNESIUM ACETATE/ZIRCONIUM ACETATE/MAGNESIA SYSTEM.

TABLE VIII

Setting time of slurries of sillimanite and magnesium acetate/zirconium acetate/magnesia system.

| % magnesium acetate in zirconium acetate solution | Volume acetate solution (ml) | Volume magnesia Dispersion (ml) | Setting time (approx.) | Observations |
|---|---|---|---|---|
| 20 | 30 | 10 | 15 mins. | weak gel |
| 20 | 29 | 11 | 6 mins. | |
| 20 | 28 | 12 | 15 mins. | considerable development of strength |
| 20 | 25 | 15 | 20 mins. | |
| 20 | 24 | 16 | 60 mins. | |
| 20 | 22 | 18 | 5 hrs. | weak gel |
| 15 | 29 | 11 | 11 mins. | soft gel |
| 15 | 28 | 12 | 5 mins. | development of strength |
| 15 | 25 | 15 | 21 mins. | |
| 15 | 24 | 16 | 25 mins. | |
| 10 | 29 | 11 | 7 mins. | soft gel |
| 10 | 28 | 12 | 4 mins. | developement of strength |
| 10 | 26 | 14 | 6 mins. | |
| 10 | 25 | 15 | 12 mins. | |
| 10 | 24 | 16 | 18 mins. | |

The composition of the sillimanite mix used is given in Example IV.

EXAMPLE XXIII

PREPARATION OF REFRACTORY OBJECTS BASED ON ZIRCON

A slurry was prepared by mixing 400 g zircon mix with 40 ml binder and the time required for the slurry to set was noted. The results are given in Table IX.

TABLE IX

SETTING TIME OF SLURRIES OF ZIRCON POWDER MIX AND MAGNESIUM ACETATE/ZIRCONIUM ACETATE/MAGNESIA SYSTEM

| % magnesium acetate in zirconium acetate solution | Volume Acetate solution (ml) | Volume Magnesia Dispersion (ml) | Setting time (approx.) | Observations |
|---|---|---|---|---|
| 20 | 29 | 11 | 25 mins. | Soft Slurry, little development of strength |
| 15 | 29 | 11 | 9 mins. | " |
| 15 | 28 | 12 | 6 mins. | Considerable strength developed |
| 15 | 25 | 15 | 16 mins. | |
| 10 | 28 | 12 | 6 mins. | Firm slurry |
| 10 | 24 | 16 | 22 mins. | |

The composition of the zircon powder mix used is given in Example I.

PREPARATION OF REFRACTORY OBJECTS BASED ON FUSED ALUMINA

EXAMPLE XXIV

A slurry was formed by mixing 200 g fused alumina mix with 25 ml binder and the setting time was noted. The results are given in Table X.

TABLE X

SETTING TIME OF SLURRIES OF FUSED ALUMINA AND MAGNESIUM ACETATE/ZIRCONIUM ACETATE/MAGNESIA SYSTEM.

| % magnesium acetate in zirconium acetate solution | Volume Acetate solution (ml) | Volume Magnesia Dispersion (ml) | Setting time (approx.) | Observations |
|---|---|---|---|---|
| 15 | 17.5 | 7.5 | 5 mins. | Firm Slurry |
| 15 | 18 | 7 | 8 mins. | |
| 15 | 15.5 | 9.5 | 17 mins. | |
| 10 | 18 | 7 | 7 mins. | Firm Slurry |
| 10 | 17.5 | 7.5 | 8 mins. | |

EXAMPLE XXV

USE OF MAGNESIA SUSPENSION TO GELL ZIRCONIUM FORMATE

A calcined magnesia suspension, obtained by dispersing 10 g magnesia LMO/262 grade in 50 ml glycerol and 50 ml water was used to gel a zirconium formate solution ($ZrO_2$ content approximately 20%). The suspension was mixed with the zirconium formate solution, the following results being obtained:

9 ml zirconium formate solution + 3 ml suspension — no gel 9 ml zirconium formate solution + 4 ml suspension — T gel = 25 secs.

9 ml zirconium formate solution + 5 ml suspension — T gel = 15 secs.

The gel time may be lengthened by dissolving glycine (dipolar ion forming compound) in the zirconium formate solution.

EXAMPLE XXVI

USE OF AMMONIUM ZIRCONIUM CARBONATE SOLUTIONS

Ammonium zirconium carbonate may be obtained in solution form by reacting zirconium carbonate with ammonium carbonate solution. One such solution has a $ZrO_2$ content of 10% minimum and is described in Baco Chemicals data sheet 432 of August 1969. Recently a solution with a $ZrO_2$ content of 19–21% has been introduced. (Ammonium Zirconium Carbonate (AZC) solution. This solution is described in Magnesium Elektron Ltd. data sheet 322 of July 1974. Also described in this data sheet is a solution known as Bacote 20, which is a modified form of AZC with improved stability in respect of elevated temperatures and of hydrolysis when diluted. Reference is made to British Specification 1,337,983.

MAGNESIA SUSPENSION TO GEL SOLUTION
(19–21% $ZrO_2$ content)

A calcined magnesia suspension was prepared by dispersing 10 g magnesia LMO/262 grade in 50 ml glycerol and 50 ml water. This suspension was used to gel AZC solution (19–21% $ZrO_2$ content). The following results were obtained.

9 ml AZC solution + 5 ml suspension—T gel = 1 min 9 ml AZC solution + 4 ml suspension—T gel = 1 min 20 sec.

9 ml AZC solution + 3 ml suspension—T gel = 1 min 30 sec.

9 ml AZC solution + 2 ml suspension—T gel = 2 min 45 sec.

A crucible was prepared by mixing in the order given
28 ml AZC solution
12 ml magnesia suspension
200 g of the refractory powder composition of Example II.

The resulting slurry was poured into a suitable mould, which was being vibrated. When the slurry had set (after about 10 minutes), the object was removed from the mould, then air-dried and fired at 1550° C. to give a crucible.

EXAMPLE XXVII

USE OF ZIRCONIUM NITRATE SOLUTION

An aqueous solution of zirconium nitrate is available. This solution may be gelled using the light magnesia dispersion whose preparation is described in Example XXVI. The following result was obtained:

9 ml zirconium nitrate solution + 5 ml suspension — T gel = 20 secs.

When in the foregoing examples the setting of a slurry to form a rigid coherent green shape is described it is understood that, in accordance with the invention the shape is subsequently dried and fired to provide the refractory object.

Reference is made to our copending U.S. application Ser. No. 561,347 of even date which corresponds to U.K. Pat. Application No. 35610/74 of Aug. 13 1974.

EXAMPLE XXVIII

GELLATION OF MAGNESIUM LACTATE-ZIRCONIUM ACETATE SOLUTIONS
USE OF MAGNESIUM SUSPENSION AS GELLING AGENT

A magnesium suspension, obtained by dispersing 10 g light magnesia (LMO/262 grade) in a mixture of 50 ml glycerol and 50 ml water, was used to gel solutions of magnesium lactate $3H_2O$, in zirconium acetate solution.

| Wgt. of magnesium lactate (gms)/100 ml zirconium acetate solution | Vol. lactate solution (ml) | Vol. dispersion | T gel | |
|---|---|---|---|---|
| 4 | 9 | 4 | 70 secs. | Good development of strength on standing |
| 4 | 9 | 5 | 75 secs. | |
| 4 | 9 | 6 | 2¼ mins. | |
| 4 | 9 | 7 | 4½ mins. | |
| 4 | 9 | 8 | >2 hrs. | |
| 5 | 9 | 4 | 1½ mins. | Soft gels initially but considerable development of strength on standing |
| 5 | 9 | 5 | 1¾ mins. | |
| 5 | 9 | 6 | 3¼ mins. | |
| 5 | 9 | 7 | 11 mins. | |
| 10 | 9 | 4 | 50 mins. | |
| 10 | 9 | 5 | 17 mins. | |

For a further technical discussion of magnesia reference is made to the 26th Extra Pharmacoepia 1972 Page 137.

I claim:

1. A method of manufacturing refractory articles comprising the steps of:
   a. preparing a gellable, liquid binder for a refractory powder by mixing an aqueous solution of a zirconium salt and a dispersion of calcined magnesia powder in a mixture of from 20 to 90% water and from 80 to 10% of a polyhydric alcohol;
   b. mixing a refractory powder with the liquid binder to form a liquid, flowable slurry thereof, the amounts of zirconium salt, magnesium powder and refractory powder being such that the slurry will set to a coherent state upon standing;
   c. pouring the slurry while liquid and flowable into a mold;
   d. allowing the slurry in the mold to set to form a coherent green shape; and
   e. removing the green shape from the mold, drying the green shape, and firing the dried green shape to form a sintered refractory mass.

2. The method of claim 1 wherein a substance controlling the speed of gelling is added to said liquid binder, said substance being chosen from the group consisting of magnesium salt, ammonium lactate, a compound which in solution provides a dipolar ion (Zwitterion), a polyhydric alcohol and a monosaccharide.

3. The method of claim 1 wherein said magnesia is light magnesia having a bulk density such that 20 grams occupies at least 150 cubic centimeters.

4. The method of claim 1 wherein said zirconium salt is selected from the group consisting of a zirconium acetate, zirconium oxychloride, zirconium formate, and ammonium zirconium carbonate.

5. The method of claim 1 where said zirconium salt is zirconium acetate.

6. The method of claim 1 wherein said polyhydric alcohol is glycerol.

7. The method of claim 1 wherein said polyhydric alcohol is ethylene glycol.

* * * * *